United States Patent
Li et al.

(10) Patent No.: US 12,260,126 B2
(45) Date of Patent: *Mar. 25, 2025

(54) SSD MANAGED HOST WRITE ATOMICITY WITH ARBITRARY TRANSFER LENGTH

(71) Applicant: SK hynix NAND Product Solutions Corp., Rancho Cordova, CA (US)

(72) Inventors: Peng Li, Beaverton, OR (US); Jawad Khan, Portland, OR (US); Jackson Ellis, Fort Collins, CO (US); Sanjeev Trika, Portland, OR (US)

(73) Assignee: SK hynix NAND Product Solutions Corp., Rancho Cordova, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/618,532

(22) Filed: Mar. 27, 2024

(65) Prior Publication Data

US 2024/0264774 A1  Aug. 8, 2024

Related U.S. Application Data

(63) Continuation of application No. 16/987,165, filed on Aug. 6, 2020, now Pat. No. 12,019,910.

(51) Int. Cl.
*G06F 3/06* (2006.01)
*G06F 12/1009* (2016.01)

(52) U.S. Cl.
CPC .......... *G06F 3/0659* (2013.01); *G06F 3/0619* (2013.01); *G06F 3/0656* (2013.01); *G06F 3/0679* (2013.01); *G06F 12/1009* (2013.01); *G06F 2212/657* (2013.01)

(58) Field of Classification Search
CPC .... G06F 3/0619; G06F 3/0656; G06F 3/0659; G06F 3/0679; G06F 3/0685; G06F 12/0246; G06F 12/1009; G06F 13/1673; G06F 13/28; G06F 2212/657; G06F 2212/7203

See application file for complete search history.

(56) References Cited

U.S. PATENT DOCUMENTS

| 2008/0270744 A1* | 10/2008 | Hashimoto ......... G06F 13/1673 711/217 |
| 2010/0191896 A1 | 7/2010 | Yang et al. |
| 2012/0030408 A1 | 2/2012 | Flynn et al. |

(Continued)

OTHER PUBLICATIONS

Notice of Allowance dated Feb. 28, 2024 in U.S. Appl. No. 16/987,165, pp. 1-9.

(Continued)

*Primary Examiner* — Larry T Mackall
(74) *Attorney, Agent, or Firm* — Byrne Poh LLP

(57) ABSTRACT

An embodiment of an electronic apparatus may include one or more substrates, and logic coupled to the one or more substrates, the logic to control access to a primary persistent storage with a first type of media and a nonvolatile memory buffer with a second type of media that is different from the first type of media, store metadata for incoming write data in the nonvolatile memory buffer, store other data for the incoming write data in the primary persistent storage, and provide both runtime and power-fail write atomicity for the incoming write data. Other embodiments are disclosed and claimed.

20 Claims, 10 Drawing Sheets

(56) References Cited

U.S. PATENT DOCUMENTS

2017/0185354 A1    6/2017  Doshi et al.

OTHER PUBLICATIONS

NVM Express Workgroup, "NVM Express Base Specification", Technical Report, NVM Express Revision 1.4, Jul. 10, 2019, pp. 1-403.
Office Action dated Aug. 31, 2023 in U.S. Appl. No. 16/987,165, pp. 1-36.
U.S. Appl. No. 16/987,165, filed Aug. 6, 2020, pp. 1-21.

* cited by examiner

75

Host Write Metadata Item

Item address: 0X00200000
Start LBA: NULL
Number of LBAs: NULL
State: in-process
Pointer to NAND address item: NULL

NAND Address Item 1

Item address: 0X00400000
NAND Address: NULL
Start LBAs: NULL
State: in-process
Pointer to the host write metadata item: 0x00200000
Pointer to the next NAND address item: 0x00400020

77

NAND Address Item 2

Item address: 0X00400020
NAND Address: NULL
Start LBAs: NULL
State: in-process
Pointer to the host write metadata item: 0x00200000
Pointer to the next NAND address item: 0x00400040

78

NAND Address Item 32

Item address: 0X004003E0
NAND Address: NULL
Start LBAs: NULL
State: in-process
Pointer to the host write metadata item: 0x00200000
Pointer to the next NAND address item: NULL

FIG. 7B

Host Write Metadata Item

Item address: 0X00200000
Start LBA: 0
Number of LBAs: 256
State: in-process
Pointer to NAND address item: 0X00400000

FIG. 7C

Host Write Metadata Item

Item address: 0X00200000
Start LBA: 0
Number of LBAs: 256
State: ready
Pointer to NAND address item: 0X00400000

FIG. 7D

NAND Address Item

Item address: 0X00400000
NAND Address: 0X8C4B3EAC
Start LBAs: LBA8
State: in-process
Pointer to the host write metadata item: 0x00200000
Pointer to the next NAND address item: 0x00400020

FIG. 7E

SSD MANAGED HOST WRITE ATOMICITY WITH ARBITRARY TRANSFER LENGTH

CROSS-REFERENCE TO RELATED APPLICATIONS

This application is a continuation of U.S. patent application Ser. No. 16/987,165, filed Aug. 6, 2020, which is hereby incorporated by reference herein in its entirety.

BACKGROUND

A storage device may have a variety of specifications including performance specifications, thermal specifications, and reliability/endurance specifications. Performance specifications include criteria such as input/output operations per second (IOPS), throughput/bandwidth, and latency. Reliability/endurance specifications include criteria such as drive writes per day, program/erase cycles, mean time between failure, and data retention. Power-fail write-atomicity on a storage device specifies that data for a command is either completely written or not written at all, in scenarios when there is a power-fail during the write-operation.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIGS. 7A to 7F are illustrative diagrams of examples of a host write metadata item and its corresponding NAND address items according to an embodiment;

DETAILED DESCRIPTION

Figure 1:
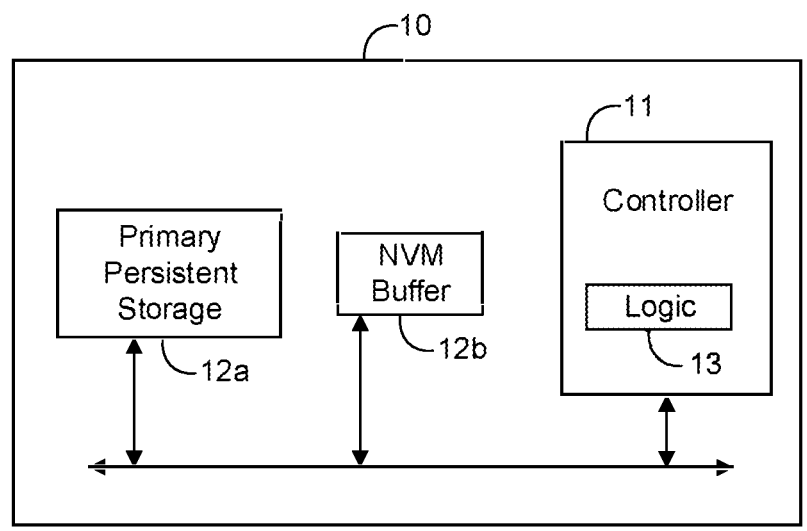
FIG. 1 is a block diagram of an example of an electronic system according to an embodiment.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smartphones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation". "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Various embodiments described herein may include a memory component and/or an interface to a memory component. Such memory components may include volatile and/or nonvolatile (NV) memory. Volatile memory may be a storage medium that requires power to maintain the state of data stored by the medium. Non-limiting examples of volatile memory may include various types of random access memory (RAM), such as dynamic RAM (DRAM) or static RAM (SRAM). One particular type of DRAM that may be used in a memory module is synchronous dynamic RAM (SDRAM). In particular embodiments, DRAM of a memory component may comply with a standard promulgated by Joint Electron Device Engineering Council (JEDEC), such as JESD79F for double data rate (DDR) SDRAM, JESD79-2F for DDR2 SDRAM. JESD79-3F for DDR3 SDRAM. JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at jedec.org). Such standards (and similar standards) may be referred to as DDR-based standards and communication interfaces of the storage devices that implement such standards may be referred to as DDR-based interfaces.

NV memory (NVM) may be a storage medium that does not require power to maintain the state of data stored by the medium. In one embodiment, the memory device may include a block addressable memory device, such as those based on NAND or NOR technologies. A memory device may also include future generation nonvolatile devices, such as a three dimensional (3D) crosspoint memory device, or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor RAM (FeTRAM), anti-ferroelectric memory, magnetoresistive RAM (MRAM) memory that incorporates memristor technology, resistive memory including the metal oxide base, the oxygen vacancy base and the conductive bridge RAM (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In particular embodiments, a memory component with non-volatile memory may comply with one or more standards promulgated by the JEDEC, such as JESD218, JESD219, JESD220-1, JESD223B, JESD223-1, or other suitable standard (the JEDEC standards cited herein are available at jedec.org).

With reference to FIG. 1, an embodiment of an electronic storage system 10 may include a controller 11 communicatively coupled to a primary persistent storage 12a with a first type of media and a NVM buffer 12b with a second type of media that is different from the first type of media. For example, the first type of media may include NAND media while the second type of media may include battery or capacitor backed up volatile memory (e.g., DRAM, SRAM, etc.) or 3D crosspoint memory (e.g., INTEL OPTANE technology). The controller 11 may include logic 13 to store metadata for incoming write data in the NVM buffer 12b, store other data for the incoming write data in the primary persistent storage 12a, and provide both runtime and power-fail write atomicity for the incoming write data. For example, a specified guaranteed power-fail write atomicity may be nominally large up to a specified maximum data transfer size (MDTS). In some embodiments, the logic 13 may be configured to store the metadata for the incoming write data in a first pool of the NVM buffer 12b, and store primary persistent storage addresses for the incoming write data in a second pool of the NVM buffer 12b. For example, the logic 13 may be further configured to maintain two or more queues for each of the first and second pools of the NVM buffer 12b, and build a linked list of primary persistent storage address items for the incoming write data in the second pool of the NVM buffer 12b.

In some embodiments, the logic 13 may be also configured to atomically update multiple entries in a logical-to-physical (L2P) indirection table after full write information for the incoming write is available based on the metadata stored in the first pool and the linked list of primary persistent storage address items. For example, the logic 13 may optionally also be configured to sequence updates of the L2P indirection table for the incoming separately from other incoming write data. In the event of a recovery from a power failure, the logic 13 may be configured to discard the metadata in the NVM buffer 12b and the other data in the primary persistent storage 12a without an update of the L2P indirection table based on an indicator in the NVM buffer (e.g., a host write item flag). In any of the embodiments herein, the primary persistent storage 12a and the NVM buffer 12b may be part of a solid state drive (SSD).

Embodiments of each of the above controller 11, primary persistent storage 12a, NVM buffer 12b, logic 13, and other system components may be implemented in hardware, software, or any suitable combination thereof. For example, hardware implementations may include configurable logic such as, for example, programmable logic arrays (PLAs), field programmable gate arrays (FPGAs), complex programmable logic devices (CPLDs), or fixed-functionality logic hardware using circuit technology such as, for example, application specific integrated circuit (ASIC), complementary metal oxide semiconductor (CMOS) or transistor-transistor logic (TTL) technology, or any combination thereof. Embodiments of the controller 11 may include a general purpose controller, a special purpose controller, a storage controller, a memory controller, a micro-controller, a general purpose processor, a special purpose processor, a central processor unit (CPU), an execution unit, etc. In some embodiments, the primary persistent storage 12a, the NVM buffer 12b, the logic 13, and/or other system memory may be located in, or co-located with, various components, including the controller 11 (e.g., on a same die).

Alternatively, or additionally, all or portions of these components may be implemented in one or more modules as a set of logic instructions stored in a machine- or computer-readable storage medium such as random access memory (RAM), read only memory (ROM), programmable ROM (PROM), firmware, flash memory, etc., to be executed by a processor or computing device. For example, computer program code to carry out the operations of the components may be written in any combination of one or more operating system (OS) applicable/appropriate programming languages, including an object-oriented programming language such as PYTHON, PERL, JAVA, SMALLTALK, C++, C# or the like and conventional procedural programming languages, such as the "C" programming language or similar programming languages. For example, the persistent storage media 12a, other persistent storage media, or other system memory may store a set of instructions which when executed by the controller 11 cause the system 10 to implement one or more components, features, or aspects of the system 10 (e.g., the logic 13, storing metadata for the incoming write data in the NVM buffer 12b, storing other data for the incoming write data in the primary persistent storage 12a, providing both runtime and power-fail write atomicity for the incoming write data, etc.).

Figure 2:
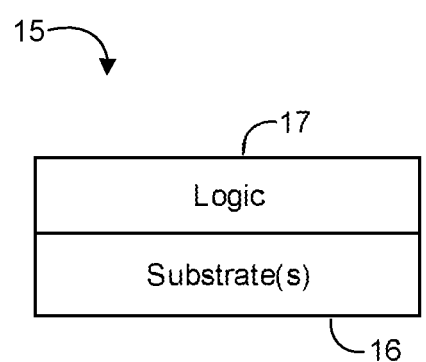
FIG. 2 is a block diagram of an example of an electronic apparatus according to an embodiment.

Turning now to FIG. 2, an embodiment of an electronic apparatus 15 may include one or more substrates 16, and logic 17 coupled to the one or more substrates 16. The logic 17 may be configured to control access to a primary persistent storage with a first type of media and a NVM buffer with a second type of media that is different from the first type of media, store metadata for incoming write data in a NVM buffer, store other data for the incoming write data in the primary persistent storage, and provide both runtime and power-fail write atomicity for the incoming write data. For example, a specified guaranteed power-fail write atomicity may be nominally large up to a specified MDTS. In some embodiments, the logic 17 may be configured to store the metadata for the incoming write data in a first pool of the NVM buffer, and store primary persistent storage addresses for the incoming write data in a second pool of the NVM buffer. For example, the logic 17 may be further configured to maintain two or more queues for each of the first and second pools of the NVM buffer, and build a linked list of primary persistent storage address items for the incoming write data in the second pool of the NVM buffer.

In some embodiments, the logic 17 may be also configured to atomically update multiple entries in a L2P indirection table after full write information for the incoming write is available based on the metadata stored in the first pool and the linked list of primary persistent storage address items. For example, the logic 17 may optionally also be configured to sequence updates of the L2P indirection table for the incoming separately from other incoming write data. In the event of a recovery from a power failure, the logic 17 may be configured to discard the metadata in the NVM buffer and the other data in the primary persistent storage without an update of the L2P indirection table based on an indicator in the NVM buffer. In any of the embodiments herein, the primary persistent storage and the NVM buffer may be part of a SSD.

Embodiments of the logic 17 may be implemented in a system, apparatus, computer, device, etc., for example, such as those described herein. More particularly, hardware implementations of the logic 17 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the logic 17 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the logic 17 may be implemented on a semiconductor apparatus, which may include the one or more substrates 16, with the logic 17 coupled to the one or more substrates 16. In some embodiments, the logic 17 may be at least partly implemented in one or more of configurable logic and fixed-functionality hardware logic on semiconductor substrate(s) (e.g., silicon, sapphire, gallium-arsenide, etc.). For example, the logic 17 may include a transistor array and/or other integrated circuit components coupled to the substrate(s) 16 with transistor channel regions that are positioned within the substrate(s) 16. The interface between the logic 17 and the substrate(s) 16 may not be an abrupt junction. The logic 17 may also be considered to include an epitaxial layer that is grown on an initial wafer of the substrate(s) 16.

Figure 3A:
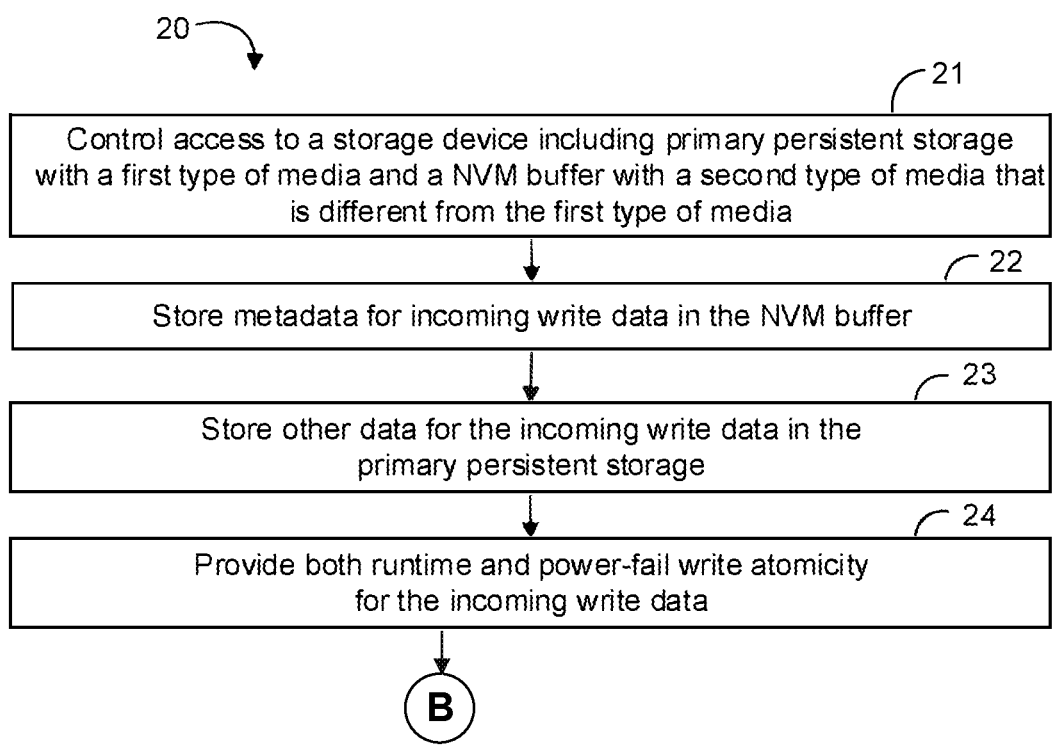
FIGS. 3A to 3C are flowcharts of an example of a method of controlling storage according to an embodiment.
Figure 3B:
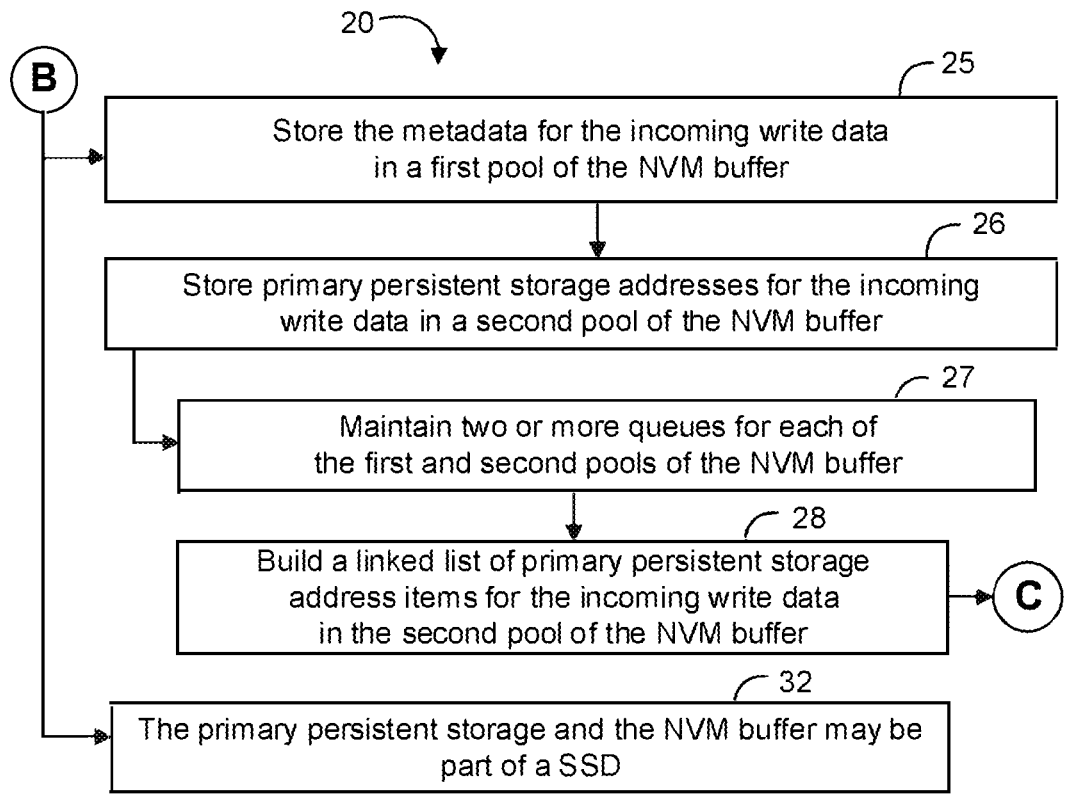
Figure 3C:
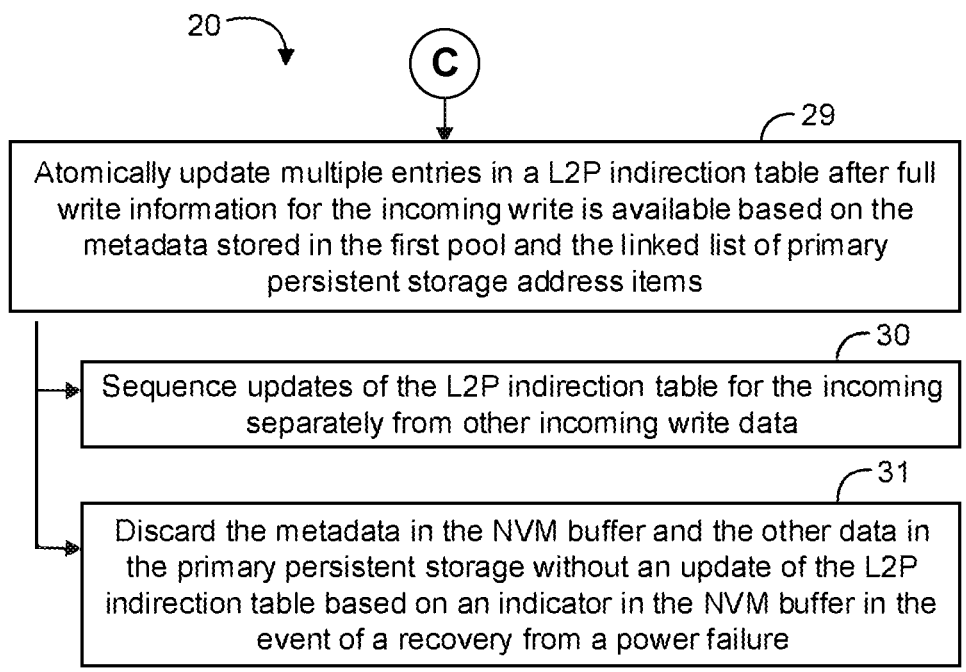

Turning now to FIGS. 3A to 3C, an embodiment of a method 20 of controlling storage may include controlling access to a primary persistent storage with a first type of media and a NVM buffer with a second type of media that is different from the first type of media at block 21, storing metadata for incoming write data in a NVM buffer at block 22, storing other data for the incoming write data in the primary persistent storage at block 23, and providing both runtime and power-fail write atomicity for the incoming write data at block 24. For example, a specified guaranteed power-fail write atomicity may be nominally large up to a specified MDTS. Some embodiments of the method 20 may also include storing the metadata for the incoming write data in a first pool of the NVM buffer at block 25, and storing primary persistent storage addresses for the incoming write data in a second pool of the NVM buffer at block 26. For example, the method 20 may include maintaining two or more queues for each of the first and second pools of the NVM buffer at block 27, and building a linked list of primary persistent storage address items for the incoming write data in the second pool of the NVM buffer at block 28.

In some embodiments, the method 20 may optionally further include atomically updating multiple entries in a L2P indirection table after full write information for the incoming write is available based on the metadata stored in the first pool and the linked list of primary persistent storage address items at block 29 (e.g., it may not be required to atomically update multiple entries in the L2P table because the data may be stored in the 2nd pool of the NVM buffer which may be PLI safe for replay). Some embodiments of the method 20 may optionally further include sequencing updates of the L2P indirection table for the incoming separately from other incoming write data at block 30 (e.g., in some embodiments the updates may alternatively be out-of-order), and/or discarding the metadata in the NVM buffer and the other data in the primary persistent storage without an update of the L2P indirection table based on an indicator in the NVM buffer in the event of a recovery from a power failure at block 31. In any of the embodiments herein, the primary persistent storage and the NVM buffer may be part of a SSD at block 32.

Embodiments of the method 20 may be implemented in a system, apparatus, computer, device, etc., for example, such as those described herein. More particularly, hardware implementations of the method 20 may include configurable logic such as, for example, PLAs, FPGAs, CPLDs, or in fixed-functionality logic hardware using circuit technology such as, for example, ASIC, CMOS, or TTL technology, or any combination thereof. Alternatively, or additionally, the method 20 may be implemented in one or more modules as a set of logic instructions stored in a machine- or computer-readable storage medium such as RAM, ROM, PROM, firmware, flash memory, etc., to be executed by a processor or computing device. For example, computer program code to carry out the operations of the components may be written in any combination of one or more OS applicable/appropriate programming languages, including an object-oriented programming language such as PYTHON, PERL, JAVA, SMALLTALK, C++, C# or the like and conventional procedural programming languages, such as the "C" programming language or similar programming languages.

For example, the method 20 may be implemented on a computer readable medium. Embodiments or portions of the method 20 may be implemented in firmware, applications (e.g., through an application programming interface (API)), or driver software running on an operating system (OS). Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Some embodiments may advantageously provide technology for a SSD managed host write atomicity with an arbitrary transfer length. Power-fail write-atomicity on a SSD may specify that data for a command is either completely written or not written at all, in scenarios when there is a power-fail during the write-operation. For the NVMe specification (e.g., version 1.4 dated Jun. 10, 2019; www.nmvexpress.org), various parameters (e.g., capabilities) reported by the NVMe device to the host may relate to write atomicity. For example, each namespace may specify one or more of the following parameters: NAWUPF—writes below this size are guaranteed to be power-fail atomic; NABO and NABSPF—writes crossing specified offset-length pair boundaries are not required to be atomic; NAWUN and NABSN—counterparts that indicate atomicity requirements for overlapping writes in normal (e.g., non-power-fail/runtime) situations; AWUPF and AWUN—indicate power-fail and normal atomicity at a controller-level (e.g., across all namespaces). The NABO field is used for both power-fail and 'normal' atomicity. Other storage protocols (e.g., SATA, SAS, etc.) have respective alternate means of specifying atomicity capability of the storage devices.

In conventional storage devices, incoming writes are typically buffered in high speed SRAM buffers for performance, and it is important to optimize this SRAM usage to control device cost. For example, supporting large atomicity (e.g., large AWUPF, NAWUPF, AWUN and NAWUN parameter values), while good for performance, may be prohibitively costly. Some conventional storage devices that support write-atomicity with arbitrary transfer length may utilize a large SRAM buffer to temporarily store incoming writes until the complete data is available. The writes are then written to the underlying non-volatile media. These storage devices may also require high local capacitance to be able to save the writes in case of a power-fail during the buffer-save operation. For example, to support 128 kilobyte (KB) write-atomicity on a SSD namespace that supports queue-depth of 128 requires at least 16 megabytes (MB) of SRAM. Increasing write-atomicity and queue-depth capabilities has a quadratically increasing effect on associated cost.

Some other approaches may involve the host providing storage and/or support. In a journaling approach, for example, atomicity with arbitrary transfer length can be supported at the host level. For example, journaling file systems first write host data to an on-device journal. Once a completion is received, the host data are written again to the final destination. The disadvantage of this approach is that it doubles the amount of data that is written to the device. Another host level approach includes reduced write-granularity and host-tracking. The host breaks the host transfer length into smaller (e.g., 4 KB) chunks, and tracks completion of each of the chunks. The disadvantages of this approach are software overhead (performance and memory consumption) and complexity to track completion per chunk. Another host level approach may include transaction support. The SSD may support write-transactions that provide atomicity across write-requests, by having the host specify which writes should be bundled. The SSD can then process the specified writes atomically. For example, the SSD may place the incompletely received write-data in NAND media, and update its L2P indirection table only after the write-data for the transaction is completely received inside the SSD. This approach has the disadvantage that the host must provide the transaction info, which requires special and complex software changes, all the way from the OS to the application that wants to use the capability. This approach also does not handle runtime (e.g., non-power-fail/runtime) atomicity of overlapped writes.

Some embodiments may overcome one or more of the foregoing problems. For example, some embodiments may provide one or more of the following advantages: scalable and cost-effective technology, with a nominally large guaranteed power-fail write atomicity up to a specified MDTS; no host level writes amplification of the journaling techniques; no host side (e.g., software) changes for tracking chunked writes; no device-host protocol changes required to specify transactions; and/or atomicity technology for both power-fail and runtime atomicity.

For an embodiment of a NVMe compatible, NAND-based SSD, for example, capability flags may be set to specify a large or maximum write-atomicity and no-boundary constraints. Incoming write data, even if not completely available, may placed in a combination of SRAM and on the NAND media (e.g., without requiring the host to specify transaction information). The SSD's L2P indirection table may be updated after full write-information is available. During power-fail handling, in case that the host write cannot be completed (e.g., if the device does not have the large write data), the corresponding SRAM data and the metadata information in the internal buffers may be discarded without L2P updates and the power loss recovery (PLR) time logic may thus be signaled to not use the partial data saved in the NAND bands. Thereafter, all the associated resources may be freed. For normal (e.g., non-power-fail/runtime) large write atomicity, in this embodiment, the SSD may update the multiple L2P entries in the second pool of the NVM buffer when the corresponding write's entire data is available inside the SSD and already resident on NAND. In some embodiments, the L2P updates for different large writes may be sequenced (e.g., rather than intermingled). Advantageously, as compared to conventional SSDs, some embodiments may provide much larger atomicity sizes which may provide significant accelerations to many workloads including, for example, relational databases, key-value (KV) databases, journaling filesystems, etc.

Figure 4:
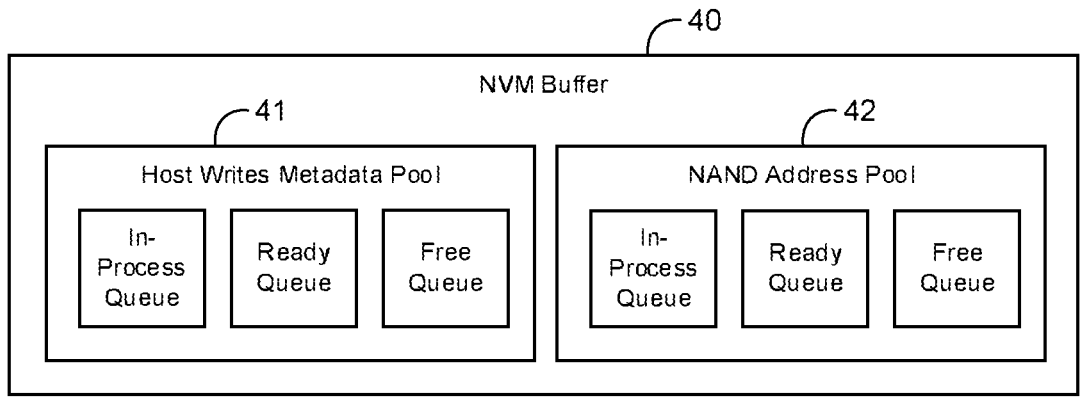
FIG. 4 is a block diagram of an example of a nonvolatile memory buffer according to an embodiment.

With reference to FIG. 4, an embodiment of management of a NVM buffer 40 may include providing a host writes metadata pool 41 and a NAND address pool 42. Each of the pools 41 and 42 may include respective in-process, ready, and free queues. The NVM buffer 40 may be a relatively small buffer (e.g., as compared to the size of a buffer needed to store other incoming write data) internal to a SSD. In some embodiments, the internal NVM buffer 40 may be implemented as persistent volatile memory (e.g., battery or capacitor backed-up DRAM or SRAM). For example, the SSD may include POWER LOSS IMMINENT (PLI) technology with energy storing capacitors. The energy storing capacitors may provide enough energy (power) to complete any commands in progress and to make sure that any data in the DRAMs/SRAMs is committed to the non-volatile NAND media. The capacitors may act as backup batteries for the persistent volatile memory. Alternatively, the NVM buffer 40 may be implemented using 3D crosspoint memory (e.g., OPTANE technology).

As shown in FIG. 4, the NVM buffer 40 may be separated into the two memory pools 41 and 42. The pool 41 may be utilized for the host writes' metadata, and the other pool 42 may be utilized for the NAND address(es) of the corresponding host writes. In some embodiments, the items in each memory pool 41 and 42 may have three states (e.g., IN-PROCESS, READY, and FREE), and the items may be allocated into the corresponding queues.

In some embodiments, a host write metadata item in the host writes metadata pool may have the following elements: a start logical block address (LBA); a transfer length; a state (IN-PROCESS, READY, or FREE); and a pointer to a NAND address item (e.g., the pointer points to the head of a linked list of NAND address items pre-allocated by this host write command). When a host write metadata item is in the ready queue, the item will not be freed until all its NAND address items have valid NAND addresses. In some embodiments, a NAND address item in the NAND address pool may have the following elements: a NAND address; a start LBA in this NAND address; a state (IN-PROCESS, READY, or FREE); a pointer to the host write metadata item, which allocated this NAND address item; and a pointer to the next NAND address item, which is allocated by the same host write metadata item. After a NAND address item is in the ready queue, the item may be freed after the update of the L2P indirection table.

Figure 5:
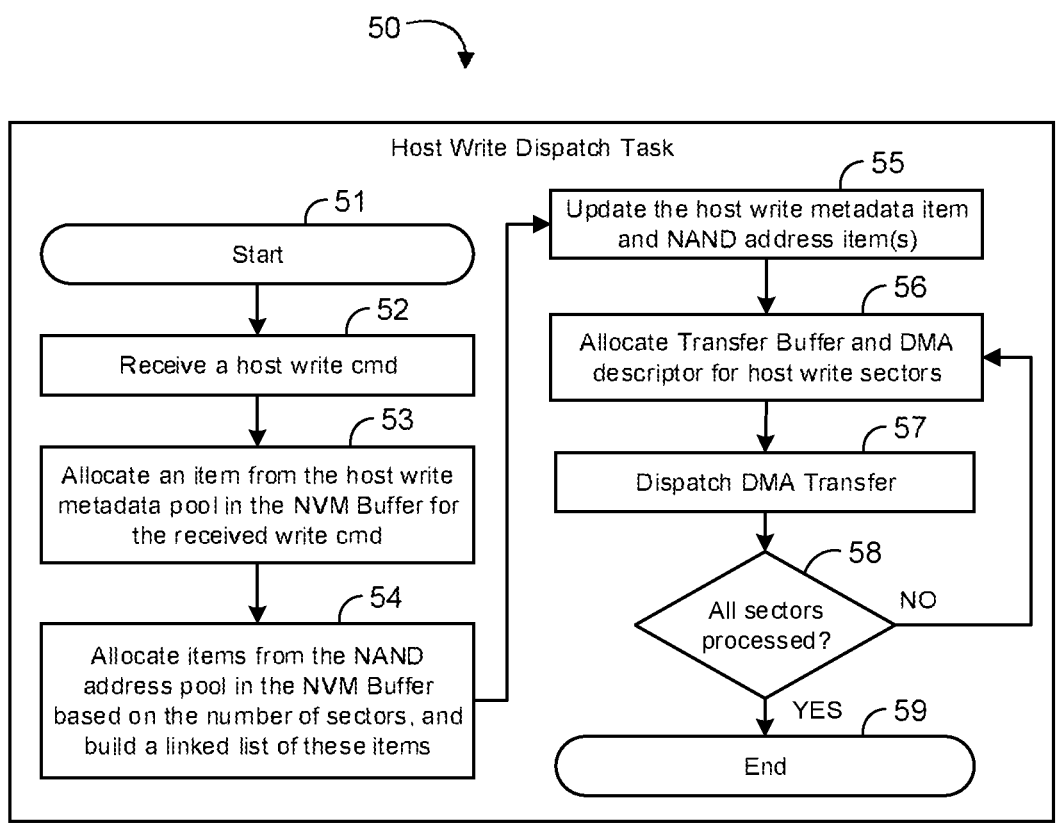
FIG. 5 is a flowchart of an example of a host write dispatch flow according to an embodiment.

An example host write flow may include a host write dispatch task and a host write completion task. With reference to FIG. 5, an example host write dispatch flow 50 may start at block 51. The flow 50 may include receiving a host write command at block 52, allocating an item from the host write metadata pool in the NVM buffer for the received write command at block 53, allocating items from the NAND address pool in the NVM Buffer based on the number of sectors, and building a linked list of these items at block 54. The flow 50 may then include updating the host write metadata item and NAND address item(s) at block 55, allocating a transfer buffer and direct memory access (DMA) descriptor for the host write sectors at block 56, and dispatching a DMA transfer at block 57. The flow 50 may then include determining if all sectors are processed at block 58 and, if so, ending at block 59. If all sectors are not processed at block 58, the flow 50 may return to block 56.

In some embodiments, the host write dispatch task may only handle the DMA transfer between the host memory and the SSD transfer buffer. When the data is available in the transfer buffer, a different task (e.g., a NAND write task) may write the data into the NAND media. Additionally, each allocated transfer buffer slot may contain a pointer that points to the corresponding host write metadata item, such that when the data is written into the media the pre-allocated NAND address items may be updated.

In some embodiments, the host write completion task may monitor the completion of each DMA transfer. When the last sector of a host write command has been written to the SSD transfer buffer, the SSD may acknowledge host write command completion and update the state of the host write metadata item to READY, because the transfer buffer may be PLI safe even if the data may not have been written to the media yet.

Figure 6:
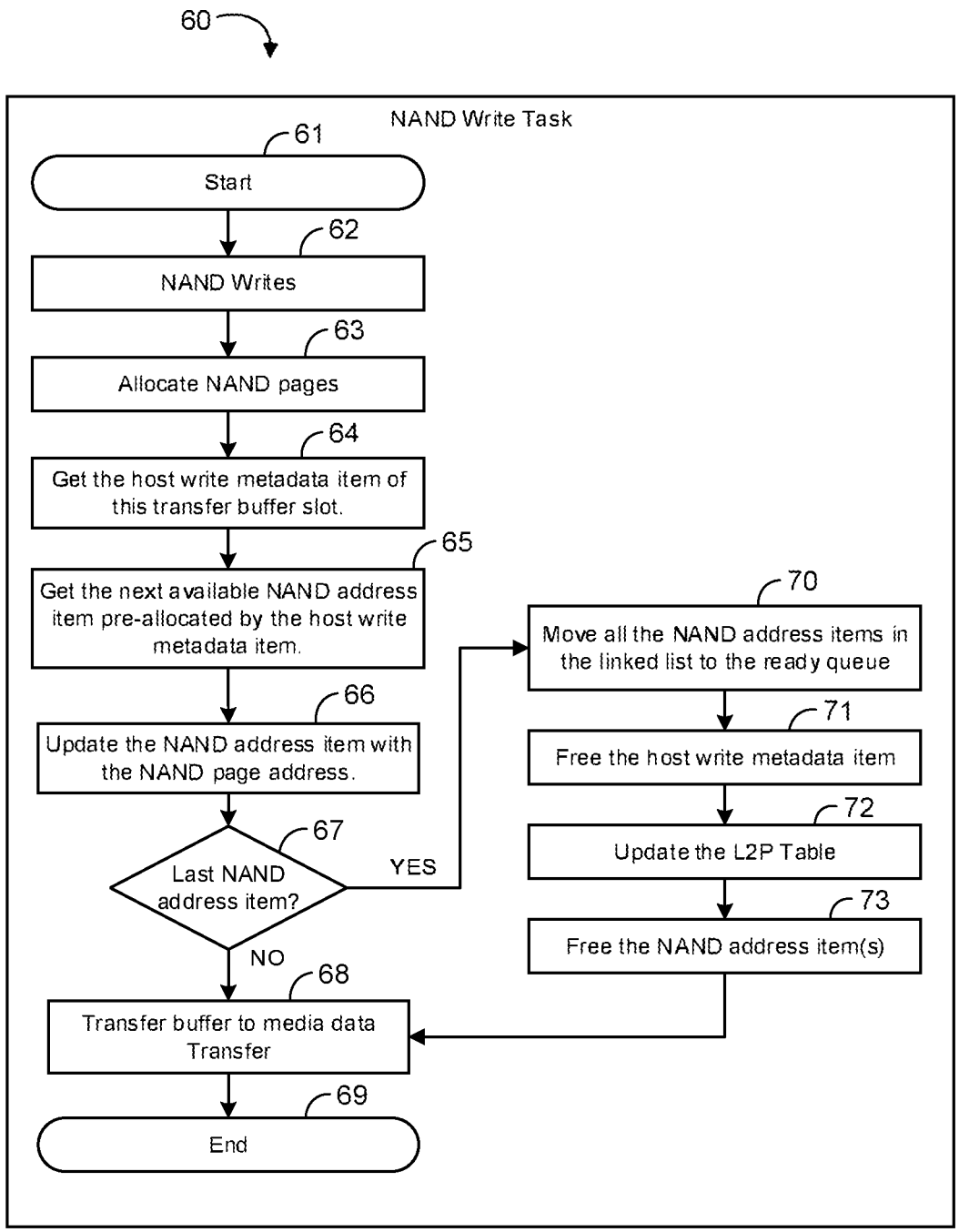
FIG. 6 is a flowchart of an example of a NAND write flow according to an embodiment.
Figure 7F:
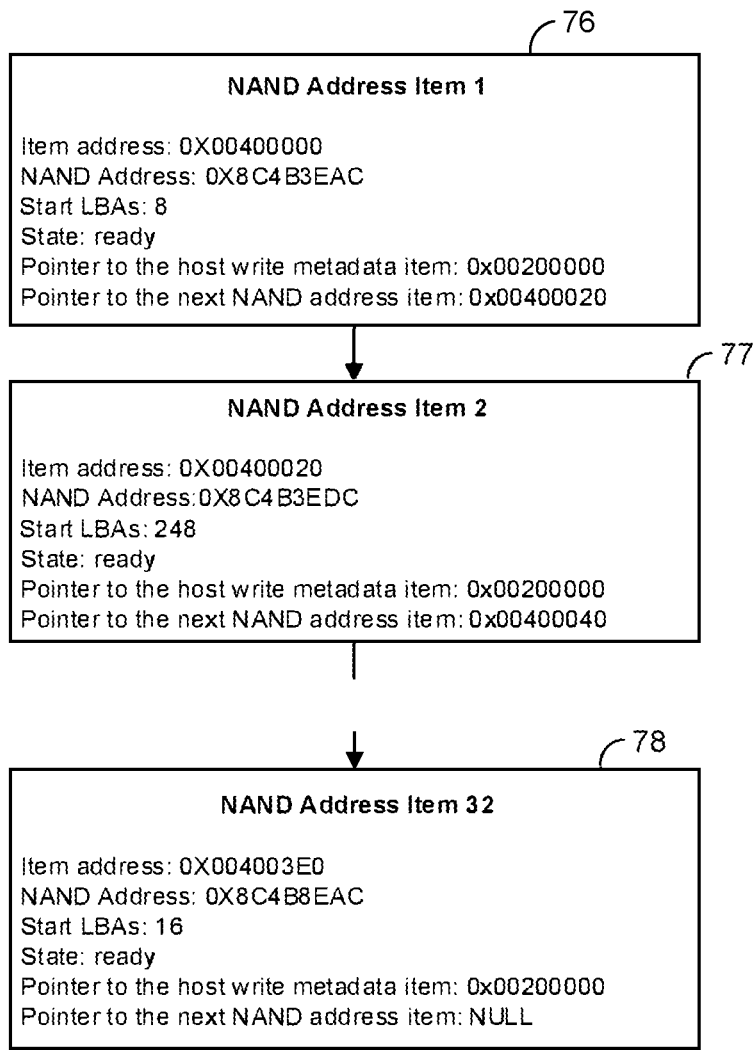

With reference to FIG. 6, an embodiment of a NAND write flow 60 may start at block 61. The flow 60 may include initiating NAND writes at block 62, allocating NAND pages at block 63, getting the host write metadata item of this transfer buffer slot at block 64, getting the next available NAND address item pre-allocated by the host write metadata item at block 65, and updating the NAND address item with the NAND page address at block 66. The flow 60 may then include determining if the current NAND address item is the last NAND address item at block 67 and, if not, performing a transfer buffer to media data transfer at block 68 and ending at block 69. If the current NAND address item is the last NAND address item at block 67, the flow 60 may proceed to moving all the NAND address items in the linked list to the ready queue a block 70, freeing the host write metadata item at block 71, updating the L2P table at block 72, and freeing the NAND address item(s) at block 73. The flow 60 may then proceed to performing a transfer buffer to media data transfer at block 68 and ending at block 69.

The NAND write task may be run independently and in parallel with other tasks, such as the host write task. As long as there are enough data in the transfer buffer to dispatch NAND program operations, the task may become active. During NAND writes, the NAND page address will not be updated in the L2P table directly. The NAND page addresses will be saved in the pre-allocated NAND address item first. When all the NAND address items allocated by the same host write metadata item have been updated, the host write metadata item can be freed, and the NAND page addresses will be atomically updated in the L2P table. The NAND address items will be freed after the L2P update.

Some embodiments may further provide collision handling technology. For host reads, for example, if the LBAs are overlapped with the ones in the ready queue of the host writes metadata pool, then a read collision may be detected. In this case, the corresponding pending writes in the transfer buffer may then be flushed into the media immediately. The host read will be processed after the L2P table is updated after the media writes. For host writes, collisions may be ignored because each write is handled atomically and will meet the in-order requirement. For example, if two pending write commands have 4 overlapping sectors A, B, C, D and thread-1 handles command-1 and thread-2 handles command-2 (shown in time order):

- Thread-1 schedules write of sector A with a1;

Thread-2 schedules writes of sectors A and B with a2 and b2;

Thread-1 schedules writes of sectors B, C, D with b1, c1, d1; and

Thread-2 schedules writes of sectors C and D with c2 and d2.

The L2P table will be updated with either (a1, b1, c1, d1) or (a2, b2, c2, d2) by using the flow 60, which are both legal states.

Atomicity Support with Variable Transfer Length Examples

In this case of a PLI event or a host link going down before the SSD acknowledges a write completion, the host write metadata item is in the IN-PROCESS state. In the subsequent power up or host link coming back up, the SSD may recover the item's status from the NVM buffer. For any items that are in the IN-PROCESS state, the SSD will free them and all its associated NAND address items without L2P updates. Note that partial data of this host command may have been written to the media, but because the corresponding L2P entry still points to the previous copy, no data is written to the SSD from the host's perspective.

In this case of a PLI event or a host link going down after the SSD acknowledges a write completion, the host write metadata item will be in the READY state. However, the host write metadata item's associated NAND address items may have different states. In case of the host link going down without losing power, the SSD may continue to the NAND write process (e.g., shown in FIG. 6), and update the L2P table after all the data of this host command has been written to the media. In case of a PLI event, all the host data has been transferred to the transfer buffer, but not all of the host data has been written to the NAND media. In the subsequent power up, the SSD may first recover all the items from the NVM buffer. Then the SSD may recover the data in the transfer buffer, which is PLI safe, and continue the NAND write process (e.g., as shown in FIG. 6). The L2P table will be updated once all the data of the command has been written to the media.

Operation Flow Example

With reference to FIGS. 7A to 7F, embodiments of a host write metadata item 75 and corresponding NAND address items 76, 77 . . . 78 illustrate how an embodiment of a SSD handles a 128 KB host write (LBA0-255) atomically. In this example, the LBA sector size is 512 bytes (B) and the SSD indirection unit (IU) granularity is 4 KB. The memory footprint per host write metadata item and NAND address item is 32 B.

After the SSD receives the host write command, the SSD allocates and initializes the host write metadata item 75 from the free queue of the host writes metadata pool (e.g., see FIG. 7A). Next, the SSD allocates 32 NAND address items 76, 77 . . . 78 from the NAND address pool free queue. The NAND address items are initialized as a linked list (e.g., see FIG. 7B). After the NAND address items have been initialized, the SSD will update the host write metadata item 75 so that the item 75 points to the head of the linked list (e.g., see FIG. 7C). Then the SSD will allocate transfer buffer (TBUF) space, setup and dispatch a DMA transfer between the host and the TBUF. When the last sector of the DMA transfer completes, the SSD will change the state of the host write metadata item 75 to READY (e.g., see FIG. 7D). As long as the last sector of the DMA transfer completes, the SSD will acknowledge the host a write completion.

The data in the TBUF will be written to the NAND media out of order using a separate kernel task, which issues NAND writes as long as there are enough data accumulated in TBUF. The following example shows the updated content of a NAND address item 76 when LBA8-15 is written to the NAND media (e.g., see FIG. 7E). Note that the L2P table will not be updated here. When the last item 78 (tail) in the linked list has been updated, the state of all the items of this linked list will be changed to ready (e.g., see FIG. 7F), the L2P table will be updated, and the corresponding host write metadata item 75 and NAND address items 76, 77 . . . 78 can be freed.

The technology discussed herein may be provided in various computing systems (e.g., including a non-mobile computing device such as a desktop, workstation, server, rack system, etc., a mobile computing device such as a smartphone, tablet, Ultra-Mobile Personal Computer (UMPC), laptop computer, ULTRABOOK computing device, smart watch, smart glasses, smart bracelet, etc., and/or a client/edge device such as an Internet-of-Things (IoT) device (e.g., a sensor, a camera, etc.)).

Figure 8:
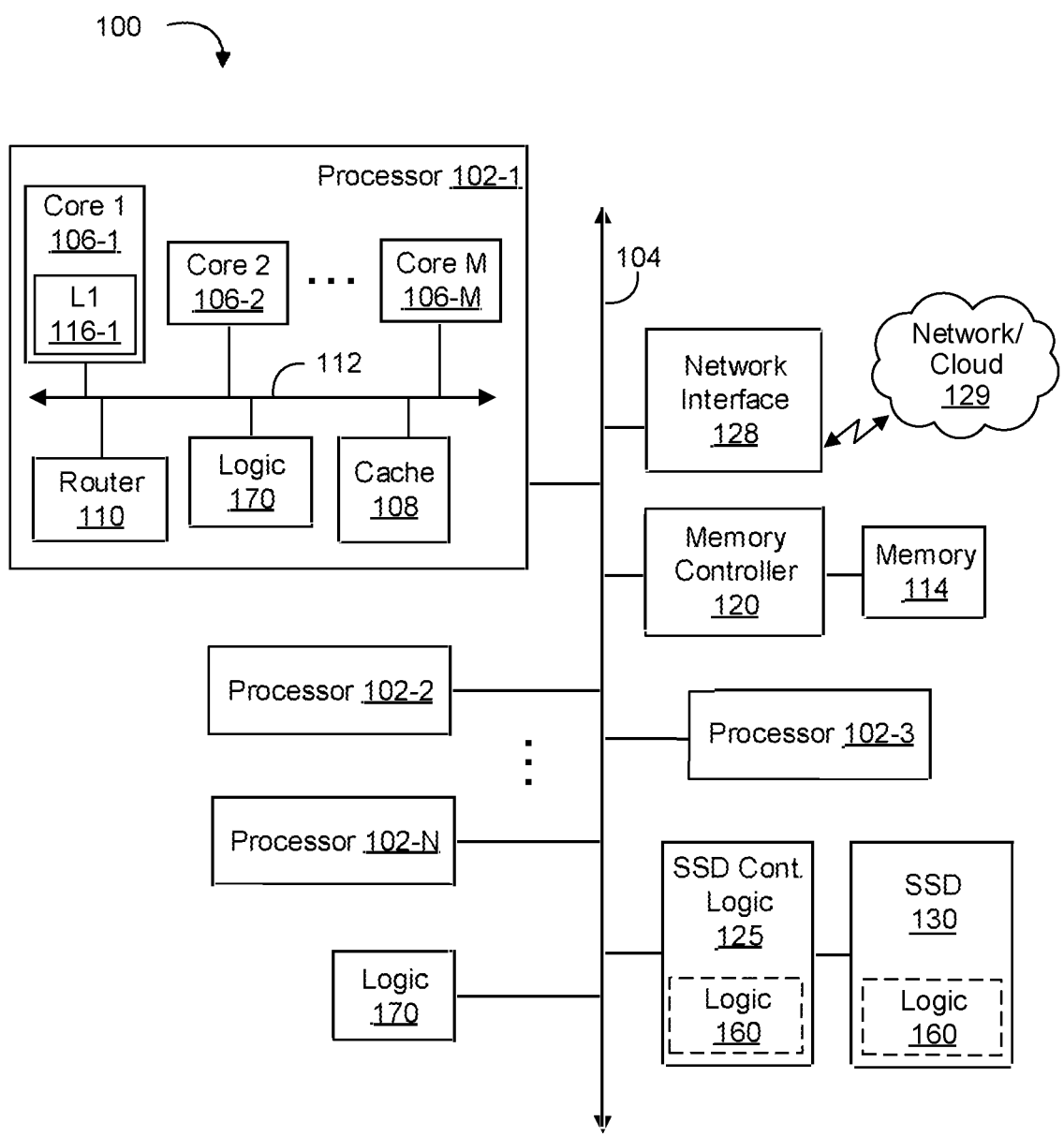
FIG. 8 is a block diagram of another example of a computing system according to an embodiment.

Turning now to FIG. 8, an embodiment of a computing system 100 may include one or more processors 102-1 through 102-N (generally referred to herein as "processors 102" or "processor 102"). The processors 102 may communicate via an interconnection or bus 104. Each processor 102 may include various components some of which are only discussed with reference to processor 102-1 for clarity. Accordingly, each of the remaining processors 102-2 through 102-N may include the same or similar components discussed with reference to the processor 102-1.

In some embodiments, the processor 102-1 may include one or more processor cores 106-1 through 106-M (referred to herein as "cores 106," or more generally as "core 106"), a cache 108 (which may be a shared cache or a private cache in various embodiments), and/or a router 110. The processor cores 106 may be implemented on a single integrated circuit (IC) chip. Moreover, the chip may include one or more shared and/or private caches (such as cache 108), buses or interconnections (such as a bus or interconnection 112), logic 170, memory controllers, or other components.

In some embodiments, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that is utilized by one or more components of the processor 102-1, such as the cores 106. For example, the cache 108 may locally cache data stored in a memory 114 for faster access by the components of the processor 102. As shown in FIG. 8, the memory 114 may be in communication with the processors 102 via the interconnection 104. In some embodiments, the cache 108 (that may be shared) may have various levels, for example, the cache 108 may be a mid-level cache and/or a last-level cache (LLC). Also, each of the cores 106 may include a level 1 (L1) cache (116-1) (generally referred to herein as "L1 cache 116"). Various components of the processor 102-1 may communicate with the cache 108 directly, through a bus (e.g., the bus 112), and/or a memory controller or hub.

As shown in FIG. 8, memory 114 may be coupled to other components of system 100 through a memory controller 120. Memory 114 may include volatile memory and may be interchangeably referred to as main memory or system memory. Even though the memory controller 120 is shown to be coupled between the interconnection 104 and the memory 114, the memory controller 120 may be located elsewhere in system 100. For example, memory controller 120 or portions of it may be provided within one of the processors 102 in some embodiments.

The system 100 may communicate with other devices/systems/networks via a network interface 128 (e.g., which is in communication with a computer network and/or the cloud 129 via a wired or wireless interface). For example, the network interface 128 may include an antenna (not shown) to wirelessly (e.g., via an Institute of Electrical and Electronics Engineers (IEEE) 802.11 interface (including IEEE 802.11a/b/g/n/ac, etc.), cellular interface, 3G, 4G, LTE, BLUETOOTH, etc.) communicate with the network/cloud 129.

System 100 may also include a storage device such as a SSD device 130 coupled to the interconnect 104 via SSD controller logic 125. Hence, logic 125 may control access by various components of system 100 to the SSD device 130. Furthermore, even though logic 125 is shown to be directly coupled to the interconnection 104 in FIG. 8, logic 125 can alternatively communicate via a storage bus/interconnect (such as the SATA (Serial Advanced Technology Attachment) bus, Peripheral Component Interconnect (PCI) (or PCI EXPRESS (PCIe) interface), NVM EXPRESS (NVMe), etc.) with one or more other components of system 100 (for example where the storage bus is coupled to interconnect 104 via some other logic like a bus bridge, chipset, etc.) Additionally, logic 125 may be incorporated into memory controller logic (such as those discussed with reference to FIG. 9) or provided on a same integrated circuit (IC) device in various embodiments (e.g., on the same circuit board device as the SSD device 130 or in the same enclosure as the SSD device 130).

Furthermore, logic 125 and/or SSD device 130 may be coupled to one or more sensors (not shown) to receive information (e.g., in the form of one or more bits or signals) to indicate the status of or values detected by the one or more sensors. These sensor(s) may be provided proximate to components of system 100 (or other computing systems discussed herein), including the cores 106, interconnections 104 or 112, components outside of the processor 102, SSD device 130, SSD bus, SATA bus, logic 125, logic 160, logic 170, etc., to sense variations in various factors affecting power/thermal behavior of the system/platform, such as temperature, operating frequency, operating voltage, power consumption, and/or inter-core communication activity, etc.

Figure 9:
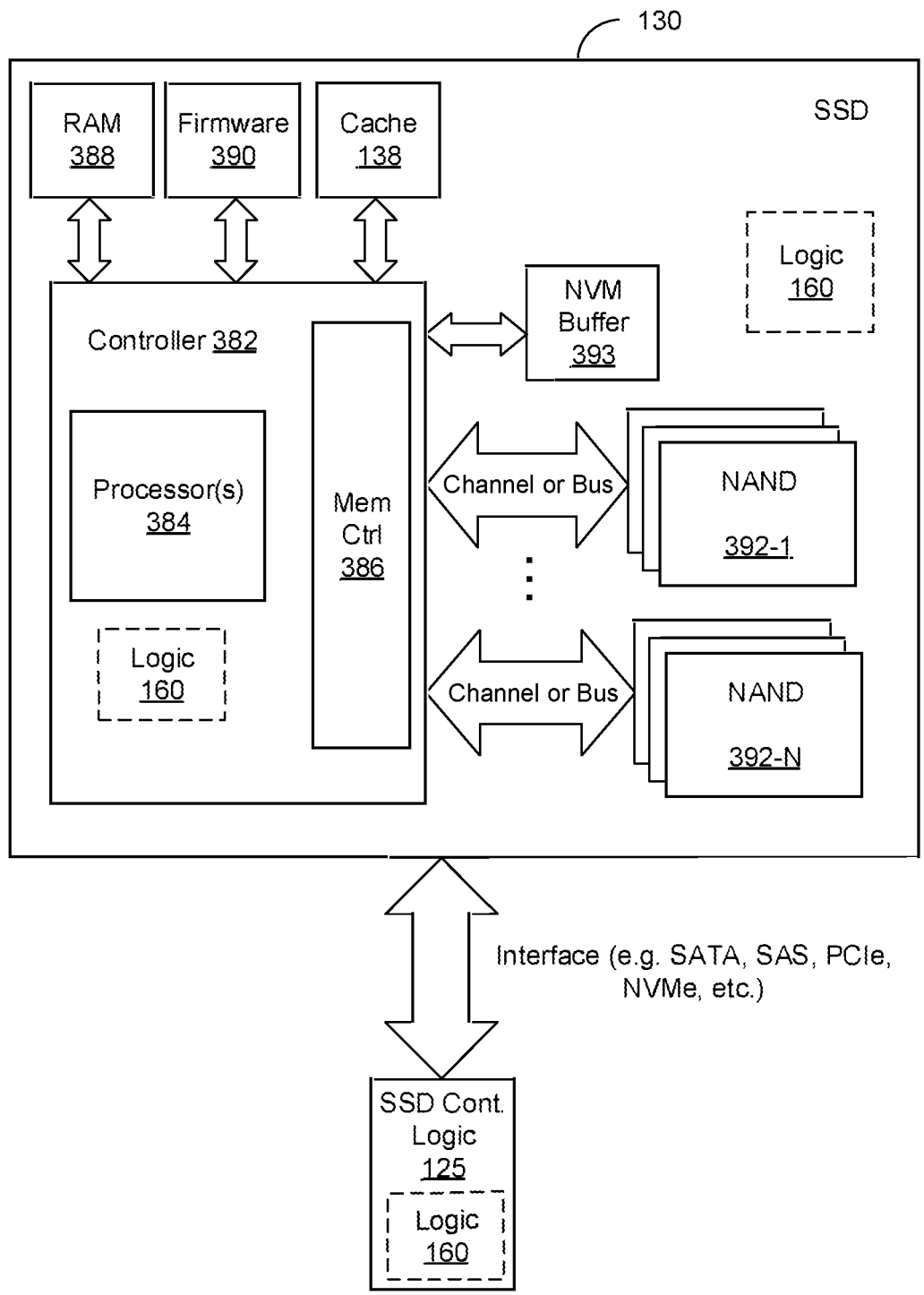
FIG. 9 is a block diagram of an example of a solid state drive (SSD) device according to an embodiment.

FIG. 9 illustrates a block diagram of various components of the SSD device 130, according to an embodiment. As illustrated in FIG. 9, logic 160 may be located in various locations such as inside the SSD device 130 or controller 382, etc., and may include similar technology as discussed in connection with FIG. 8. The SSD device 130 includes a controller 382 (which in turn includes one or more processor cores or processors 384 and memory controller logic 386), cache 138, RAM 388, firmware storage 390, one or more NAND devices 392-1 to 392-N (collectively NAND 392) and a NVM buffer 393 (e.g., which may include PLI backed up SRAM). The NVM buffer 393 and NAND 392 are coupled to the memory controller logic 386 via one or more memory channels or busses. Also, SSD device 130 communicates with logic 125 via an interface (such as a SATA, SAS, PCIe, NVMe, etc., interface). Processors 384 and/or controller 382 may compress/decompress data written to or read from NAND devices 392-1 to 392-N.

As illustrated in FIGS. 8 and 9, the SSD device 130 may include logic 160, which may be in the same enclosure as the SSD device 130 and/or fully integrated on a printed circuit board (PCB) of the SSD device 130. The system 100 may include further logic 170 outside of the SSD device 130. One or more of the features/aspects/operations discussed with reference to FIGS. 1-7F may be performed by one or more of the components of FIGS. 8 and/or 9. Also, one or more of the features/aspects/operations of FIGS. 1-7F may be programmed into the firmware 390. Further, SSD controller logic 125 may also include logic 160. Advantageously, the logic 160 may include technology to implement one or more aspects of the system 10 (FIG. 1), the apparatus 15 (FIG. 2), the method 20 (FIGS. 3A to 3C), the NVM buffer 40 (FIG. 4) the flow 50 (FIG. 5), the flow 60 (FIG. 6), the host metadata item 75 and NAND address items 76, 77 . . . 78 (FIGS. 7A to 7F), and/or any of the features discussed herein. For example, the logic 170 may include technology to implement the host device/computer system/agent aspects of the various embodiments described herein while the logic 160 may include technology to implement the storage device aspects of the various embodiments described herein. Advantageously, the host-side logic 170 may not need any special modifications to work with the storage device logic 160.

In particular, the logic 160 may be configured to store metadata for incoming write data in the NVM buffer 393, store other data for the incoming write data in the NAND 392, and provide both runtime and power-fail write atomicity for the incoming write data, with a nominally large NAWUPF/NAWAN up to the specified MDTS. In some embodiments, the logic 160 may be configured to store the metadata for the incoming write data in a first pool of the NVM buffer 393, and store NAND addresses for the incoming write data in a second pool of the NVM buffer 393. For example, the logic 160 may be further configured to maintain two or more queues for each of the first and second pools of the NVM buffer 393, and build a linked list of NAND address items for the incoming write data in the second pool of the NVM buffer 393.

In some embodiments, the logic 160 may be also configured to atomically update multiple entries in a L2P indirection table after full write information for the incoming write is available based on the metadata stored in the first pool and the linked list of NAND address items. For example, the logic 160 may also be configured to sequence updates of the L2P indirection table for the incoming separately from other incoming write data. In the event of a recovery from a power failure, the logic 160 may be configured to discard the metadata in the NVM buffer 393 and the other data in the NAND 392 without an update of the L2P indirection table based on a host write item flag in the NVM buffer 393.

In other embodiments, the SSD device 130 may be replaced with any suitable storage/memory technology/media. In some embodiments, the logic 160 may be coupled to one or more substrates (e.g., silicon, sapphire, gallium arsenide, printed circuit board (PCB), etc.), and may include transistor channel regions that are positioned within the one or more substrates. In other embodiments, the SSD device 130 may include two or more types of storage media. For example, the bulk of the storage may be NAND and may further include some faster, smaller granularity accessible (e.g., byte-addressable) NVM such as INTEL OPTANE TECHNOLOGY. As shown in FIG. 8, features or aspects of the logic 160 may be distributed throughout the system 100, and/or co-located/integrated with various components of the system 100.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrase "one or more of A, B, and C" and the phrase "one or more of A, B, or C" both may mean A; B; C; A and B; A and C; B and C; or A, B and C. Various components of the systems described herein may be implemented in software, firmware, and/or hardware and/or any combination thereof. For example, various components of the systems or devices discussed herein may be provided, at least in part, by hardware of a computing SoC such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the operations discussed herein and/or any portions the devices, systems, or any module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. An apparatus, comprising:
   memory; and
   a controller coupled to the memory, the controller configured to at least:
      control access to a primary persistent storage with a first type of media and a nonvolatile memory buffer with a second type of media that is different from the first type of media,
      store metadata for incoming write data in the nonvolatile memory buffer,
      store other data for the incoming write data in the primary persistent storage,
      provide write atomicity for the incoming write data,
      store the metadata for the incoming write data in a first pool of the nonvolatile memory buffer, and
      store primary persistent storage addresses for the incoming write data in a second pool of the nonvolatile memory buffer.

2. The apparatus of claim 1, wherein the controller is further configured to:
   maintain two or more queues for each of the first and second pools of the nonvolatile memory buffer; and
   build a linked list of primary persistent storage address items for the incoming write data in the second pool of the nonvolatile memory buffer.

3. The apparatus of claim 1, wherein the controller is further configured to update a logical-to-physical indirection table based on the metadata.

4. The apparatus of claim 3, wherein updating the logical-to-physical indirection table based on the metadata comprises:
   atomically updating multiple entries in the logical-to-physical indirection table after full write information for the incoming write is available based on the metadata stored in the first pool and the linked list of primary persistent storage address items.

5. The apparatus of claim 4, wherein the controller is further configured to:
   sequence updates of the logical-to-physical indirection table for the incoming write data separately from other incoming write data.

6. The apparatus of claim 4, wherein the controller is further configured to:
   discard the metadata in the nonvolatile memory buffer and the other data in the primary persistent storage without an update of the logical-to-physical indirection table based on an indicator in the NVM buffer in the event of a recovery from a power failure.

7. The apparatus of claim 1, wherein the primary persistent storage and the nonvolatile memory buffer are part of a solid state drive.

8. A system, comprising:
a primary persistent storage with a first type of media;
a nonvolatile memory buffer with a second type of media that is different from the first type of media; and
a controller communicatively coupled to the primary persistent storage and the nonvolatile memory buffer, the controller being configured to at least:
store metadata for incoming write data in the nonvolatile memory buffer,
store other data for the incoming write data in the primary persistent storage,
provide write atomicity for the incoming write data,
store the metadata for the incoming write data in a first pool of the nonvolatile memory buffer, and
store primary persistent storage addresses for the incoming write data in a second pool of the nonvolatile memory buffer.

9. The system of claim 8, wherein the controller is further configured to:
maintain two or more queues for each of the first and second pools of the nonvolatile memory buffer; and
build a linked list of primary persistent storage address items for the incoming write data in the second pool of the nonvolatile memory buffer.

10. The system of claim 8, wherein the controller is further configured to update a logical-to-physical indirection table based on the metadata.

11. The system of claim 10, wherein updating the logical-to-physical indirection table based on the metadata comprises:
atomically updating multiple entries in the logical-to-physical indirection table after full write information for the incoming write is available based on the metadata stored in the first pool and the linked list of primary persistent storage address items.

12. The system of claim 11, wherein the controller is further configured to:
sequence updates of the logical-to-physical indirection table for the incoming write data separately from other incoming write data.

13. The system of claim 11, wherein the controller is further configured to:
discard the metadata in the nonvolatile memory buffer and the other data in the primary persistent storage without an update of the logical-to-physical indirection table based on an indicator in the NVM buffer in the event of a recovery from a power failure.

14. The system of claim 8, wherein the primary persistent storage and the nonvolatile memory buffer are part of a solid state drive.

15. A method of controlling storage, comprising:
controlling, using a controller, access to a primary persistent storage with a first type of media and a nonvolatile memory buffer with a second type of media that is different from the first type of media;
storing metadata for incoming write data in the nonvolatile memory buffer;
storing other data for the incoming write data in the primary persistent storage;
providing write atomicity for the incoming write data
storing the metadata for the incoming write data in a first pool of the nonvolatile memory buffer, and
storing primary persistent storage addresses for the incoming write data in a second pool of the nonvolatile memory buffer.

16. The method of claim 15, further comprising:
maintaining two or more queues for each of the first and second pools of the nonvolatile memory buffer; and
building a linked list of primary persistent storage address items for the incoming write data in the second pool of the nonvolatile memory buffer.

17. The method of claim 15, further comprising updating a logical-to-physical indirection table based on the metadata.

18. The method of claim 17, wherein updating the logical-to-physical indirection table based on the metadata comprises:
atomically updating multiple entries in the logical-to-physical indirection table after full write information for the incoming write is available based on the metadata stored in the first pool and the linked list of primary persistent storage address items.

19. The method of claim 18, further comprising:
sequencing updates of the logical-to-physical indirection table for the incoming write data separately from other incoming write data.

20. The method of claim 18, further comprising:
discarding the metadata in the nonvolatile memory buffer and the other data in the primary persistent storage without an update of the logical-to-physical indirection table based on an indicator in the NVM buffer in the event of a recovery from a power failure.

* * * * *